United States Patent [19]

Smith

[11] Patent Number: 4,754,787

[45] Date of Patent: Jul. 5, 1988

[54] WOODTURNING TOOL HAVING CIRCULAR OPENING

[76] Inventor: Vincent S. Smith, 82 Warwick Street, Hobart, Tasmania, Australia

[21] Appl. No.: 854,859

[22] Filed: Apr. 22, 1986

Related U.S. Application Data

[63] Continuation-in-part of Ser. No. 658,389, Oct. 5, 1984, abandoned.

[51] Int. Cl.[4] .............................................. B23B 27/00

[52] U.S. Cl. ........................................ 142/56; 30/280; 82/36 R

[58] Field of Search .................. 30/278, 280; 408/188; 82/36 R; 142/56, 42, 41; 407/118; 144/136 C, 133 R, 46–48

[56] References Cited

U.S. PATENT DOCUMENTS

| | | | |
|---|---|---|---|
| 832,736 | 10/1906 | Justus | 30/280 |
| 2,238,222 | 8/1941 | Jones | 30/280 |
| 2,986,177 | 5/1961 | Markin | 142/56 |
| 3,422,533 | 1/1969 | Keller | 30/278 |
| 3,751,804 | 8/1973 | Pulrang | 30/280 |
| 4,284,111 | 8/1981 | Petersen et al. | 142/56 |

FOREIGN PATENT DOCUMENTS

| | | | |
|---|---|---|---|
| 866092 | 2/1953 | Fed. Rep. of Germany | 30/280 |
| 17634 | of 1906 | United Kingdom | 408/188 |

*Primary Examiner*—Douglas D. Watts
*Attorney, Agent, or Firm*—Merchant, Gould, Smith, Edell, Welter & Schmidt

[57] ABSTRACT

A hand held woodturning tool for cutting a turning timber workpiece. The tool has a long straight rod-like, tool shank and, a cutting head at one end of the tool shank and rigid with the tool shank. A hole is formed within the cutting head and has an end opening. The end opening has a periphery which is of continuous extent about the opening and which convexly arcs along part of the periphery, and an arcuate sharp cutting edge extends in a flat plane along a substantial section of the arcuate periphery part. An outer surface of the cutting head adjacent the periphery extends perpendicular to the plane containing the cutting edge and an inner surface converges toward the outer surface to form the sharp cutting edge. The tool is hand held and presented to a turning timber workpiece so that the outer surface of the cutting head adjacent the periphery rubs on a surface of the workpiece and the cutting edge engages the workpiece surface in a cutting action.

2 Claims, 2 Drawing Sheets

WOODTURNING TOOL HAVING CIRCULAR OPENING

This application is a continuation-in-part of application Ser. No. 658,389 filed Oct. 5, 1984, now abandoned.

This invention relates generally to woodturning and, in particular, to a hand-held tool for use in the shaping of a timber workpiece into an article on a woodturning lathe. The tool is applicable in the woodturning of hollow-ware articles such as bowls, goblets, canisters and other containers, and it will be convenient to hereinafter describe the invention in relation to that exemplary application. It is to be appreciated, however, that the invention is not limited to that application and may be equally applicable to other articles, for example, spindle-ware such as furniture legs.

BACKGROUND OF THE INVENTION

A large range of woodturning tools are available for shaping pieces of timber into hollow-ware articles. Those tools include cutting tools such as chisels and gouges as well as scraping tools such as scrapers, and are variously shaped to permit rapid rough cutting and scraping followed by more careful fine surface finishing of timber in order to form a smooth hollow-ware article quickly.

In using these tools a cutting edge is usually pushed into the timber fibres to force their severing and, particularly in end-grain hollowing of timber, that pushing occurs against or across the fibre grain. Whilst a fine surface finish can be achieved, it does require considerable expertise and concentration on the part of the toolturner in order to minimise ragged tearing of the timber fibre or more serious timber gouging. As such, fine finishing can be difficult to achieve and indeed articles can be severely damaged during that finishing, particularly by inexperienced woodturners.

In addition, existing cutting tools fine finish article hollows most effectively when a trailing corner of the tool cutting edge is very close to the timber surface being cut. Unless considerable care is exercised that trailing corner the timber. That can result in irreparable damage to the timber. Moreover, the tool can react violently causing it to be wrenched from the control of the woodturner with possible dangerous consequences.

SUMMARY OF THE INVENTION

It is an object of the present invention to provide a relatively simple woodturning tool which may alleviate these disadvantages of current tools. It is another object of the present invention to provide a tool that permits fine surface finishing of surfaces of timber workpieces shaped on a woodturning lathe.

With the above objects in mind, the present invention provides a hand held cutting tool for use in cutting a turning timber workpiece, including: a long straight, rod-like, tool shank; and, a cutting head at one end of the tool shank and rigid with the tool shank, a hole formed solely within the cutting head and having an end opening, the hole providing an inner surface of the cutting head and the cutting head having an outer surface outwardly of and extending at least in part about the inner surface, the end opening of the hole having a periphery which is of continuous extent about the opening and which convexly arcs along at least a partial extent thereof between the inner and outer surface, and the cutting head has an arcuate sharp cutting edge extending in a flat plane along a substantial section of the arcuate periphery part, the outer surface adjacent the periphery extending perpendicular to the plane containing the cutting edge and the inner surface converging toward the outer surface thereby to form the sharp cutting edge, whereby, in use, the tool is hand held and presented to a turning timber workpiece so that the outer surface of the cutting head immediately adjacent the periphery rubs on a surface of the workpiece and the cutting edge convexly arcs toward and engages the workpiece surface in a cutting action and the cutting head is therefore moved over the workpiece surface with the cutting edge leading to progressively cut the workpiece.

Preferably the hole extends entirely through the cutting head and has opposite end openings. The end opening periphery or peripheries of the hole is preferably circular in shape. Moreover, that hole preferably extends at least substantially perpendicular to the elongate tool shank.

Although the tool may have only one cutting edge, where the hole has opposite end openings, another cutting edge may be provided on the cutting head. To that end, the cutting head may have another flat plane face onto which the other open end of the hole opens, and that other opening may have a periphery along at least a part of which extends another cutting edge. These two cutting edges may increase the versatility of the tool during use.

BRIEF DESCRIPTION OF THE DRAWINGS

The following description refers to preferred embodiments of the woodturning tool of the present invention. To facilitate an understanding of the invention, reference is made in the description to the accompanying drawings where the tool is illustrated in those preferred embodiments. It is to be understood that the tool of the present invention is not limited to the preferred embodiments as hereinafter described and illustrated in the drawings.

In the drawings where like reference numerals identify like components.

DESCRIPTION OF THE PREFERRED EMBODIMENTS

Figure 1:
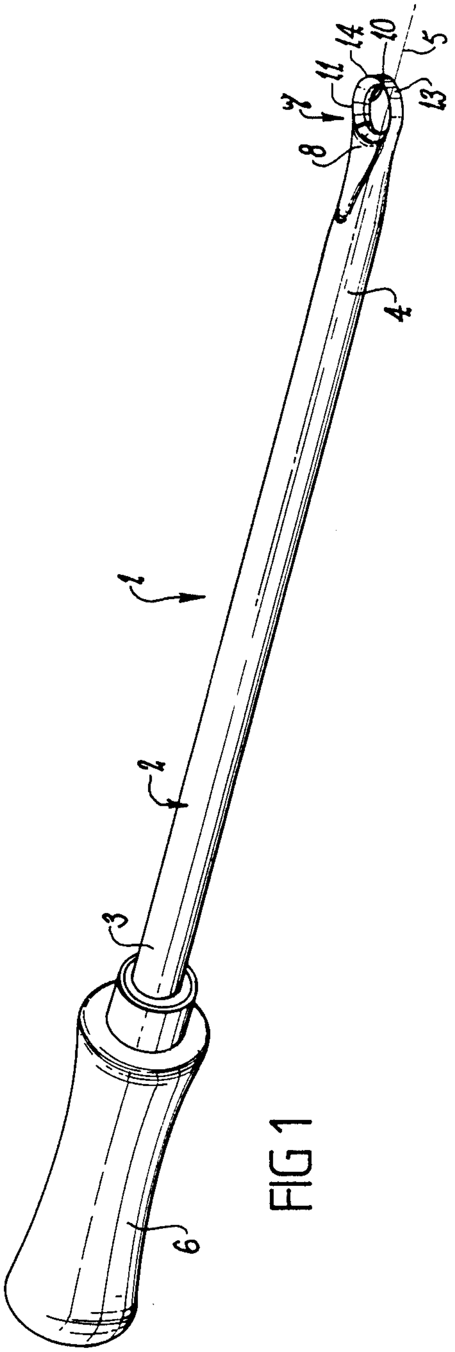
FIG. 1 is a perspective view of a first preferred embodiment of the tool of the present invention.
Figure 2:
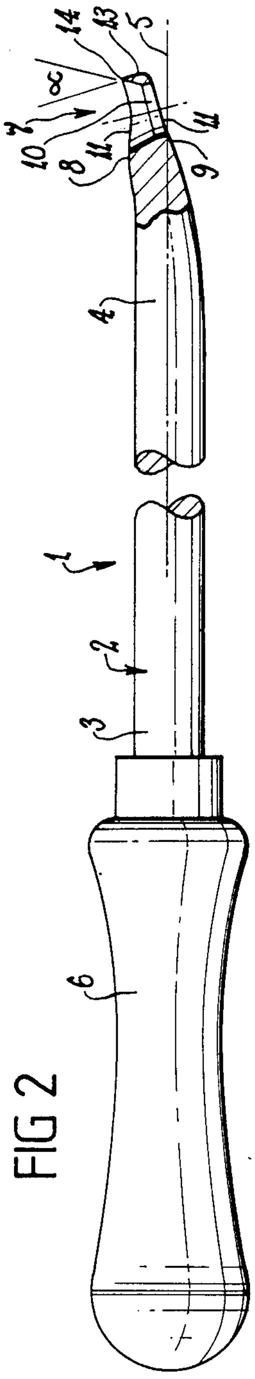
FIG. 2 is a side view partly in section of the tool of FIG. 1.

Referring initially to FIGS. 1 and 2 of the drawings, there is generally illustrated woodturning tool 1. Tool 1, includes a long, straight, rod-like tool shank 2, having spaced apart ends 3, 4. In this embodiment tool shank 2, is of a generally circular cross-sectional shape and extends generally along longitudinal axis 5.

During use of tool 1, tool shank 2, is directly or indirectly manually gripped and held with the two hands of a woodturner. Tool shank 2, is thus of a length to enable that gripping with the hands being spaced along shank 2. That may be achieved by directly gripping shank 2, with a woodturner's hands. Alternatively, as in this embodiment, tool 1, may be provided with separate handle 6, connected to end 3, of shank 2, and which one hand of the woodturner grips during tool use.

Tool 1, also includes cutting head 7, at end 4, of tool shank 2, and rigid therewith. Conveniently, cutting head 7, is formed integral with shank 2, in order to improve the overall strength of tool 1. However, head 7, may alternatively be formed separate and be removably rigidly connected to end 4.

Head 7, has a short longitudinal extent compared to that of shank 2, and has a lateral extent the same or at least not much greater than that of shank 2. Moreover, This permits ready access and maneouverability of head 7, in hollows of turning timber workpieces.

As more clearly illustrated in FIG. 2, cutting head 7, is generally angled relative to longitudinally axis 5. Whilst that angle may vary considerably, an angle of about 15° has been found particularly suitable for some finishing applications of tool 1.

Cutting head 7, includes opposed faces 8, and 9, which lie in flat planes extending parallel to one another. In this embodiments those faces 8,9, are not more than about 5 mm apart, and may be 4.5 mm apart, with head 7, having a corresponding thickness. Hole 10, extends through cutting head 7, so as to open onto both faces 8,9. However, as an alternative hole 10, may only open onto face 8, and so is blind or closed at face 9. Hole 10, extends at least substantially perpendicular to faces 8,9. In this embodiment, hole 10, is of a circular shape although other shapes having curved sections, such as ovals and slots, may be equally applicable. This hole 10, provides with faces 8,9, opening peripheries 11, which are convexly curved and of a continuous extent.

Hole 10, provides cutting head 7, with inner surface 12, and head 7, also has outer surface 13, extending partway about inner surface 12, before merging into tool shank 2. Inner surface 12, and outer surface 13, are shaped so as to form sharp cutting edge 14, between them at face 8. Edge 14, extends along a substantial section of periphery 11, of face 8, passing by axis 5, so as to extend on either lateral side of that axis 5. Edge 14, may extend through about 180°, and extend equally on each side of axis 5.

Edge 14, is formed by raking inner surface 12, adjacent face 8, away from outer surface 13, as illustrated. Thus, inner surface 12, converges toward outer surface 13, on approaching face 8. Outer surface 13, adjacent face 8, and periphery 11, remains perpendicular to the flat plane of face 8. In this embodiment, outer surface 13, may have an arcuate radius of between about 5 to 6 mm.

The included angle $\alpha$, between surfaces 12,13, may be any suitable angle which a woodturner using the tool finds suitable. In that regard, the angle may vary according to the height of the woordturner and the height of the woodturning lathe and in particular the tool rest of that lathe, bearing in mind that outer surface 13, is required to rub on the surface of timber being cut for proper cutting by tool 1. That included angle may be up to about 30°. In this embodiment, the angle is between about 15° and 30°.

Tool 1, of this embodiment includes only one cutting edge 14, within cutting head 7. It should be appreciated, however, that at least one futher cutting edge may be incorporated into tool 1, that cutting edge being provided at cutting face 9, by suitable converging inner surface 12, toward outer surface 13, adjacent face 9. Where this occurs, the included angle between surfaces 12, and 13, forming this further cutting edge may be the same as or different from the included angle forming cutting edge 14, a different angle possibly increasing the versatility of tool 1.

Tool 1, may be composed of any suitable material. In that regard, tool shank 2, and cutting head 7, may be composed of a tool metal such as high carbon steel, whilst handle 6, may be composed of timber or plastic.

In use tool 1, of this embodiment is presented to a surface defining a hollow of a turning timber workpiece (not illustrated) so that outer surface 13, rubs against that hollow surface. The length of tool shank 2, enables cutting head 7, to be inserted into the hollow yet retain sufficient shank 2, out of the hollow for gripping with the two hands of a woodturner. Tool 1, is then moved so that cutting edge 14, sweeps over that surface with cutting edge 14, leading and engaging the workpiece in a cutting action. Where the workpiece hollow is formed in timber end-grain, the sweep of cutting edge 14, will be generally outwardly along the hollow surface from the bottom to the opening of that hollow, whilst the sweep of cutting edge 14, is generally inwardly along the hollow surface formed in side-grain timber workpieces.

Figure 3:
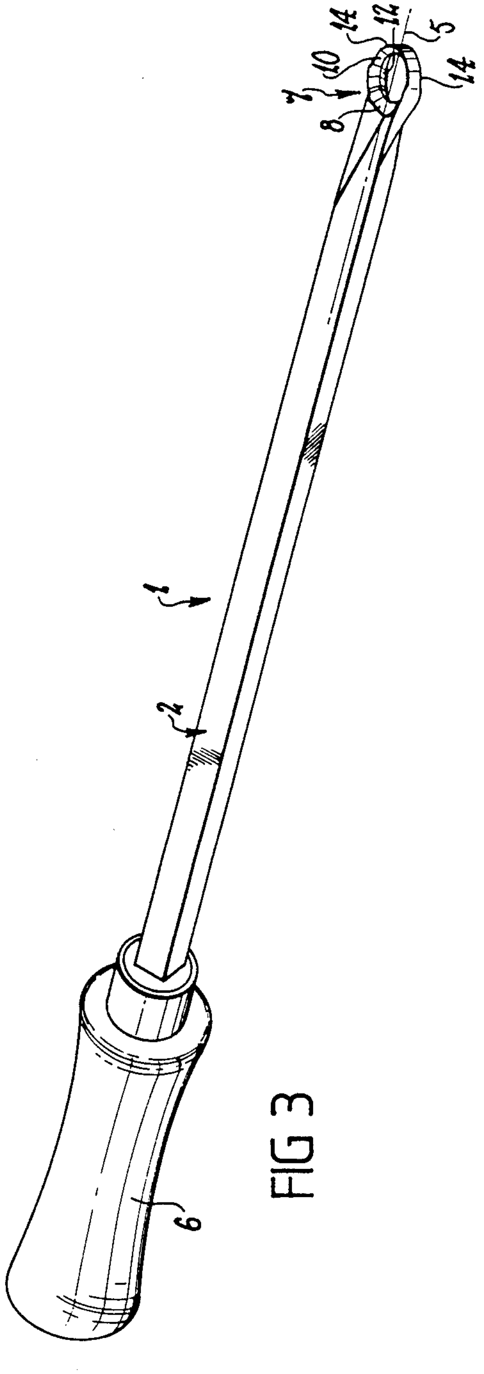
FIG. 3 is a perspective view of a second preferred embodiment of the tool of the present invention; and, FIG. 4 is a side view partly in section of the tool of FIG. 3.
Figure 4:
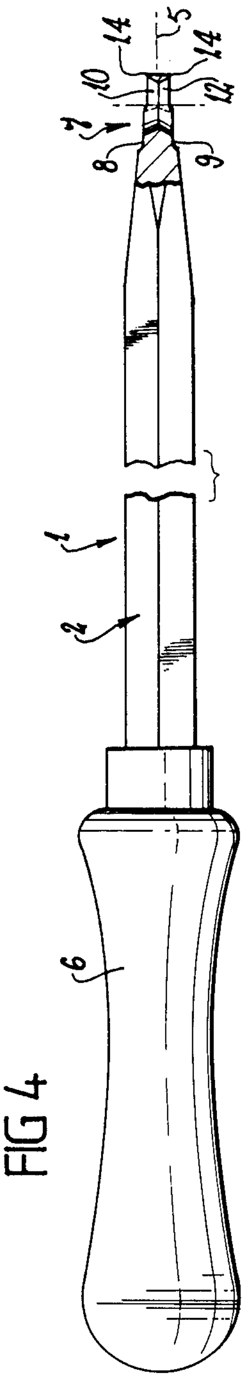

Referring now to FIGS. 3 and 4 of the drawings, there is illustrated another embodiment of tool 1, in which shank 2, is of a generally square cross-sectional shape. It has been found that this particular shape may facilitate gripping and handling of tool 1, in the two hands of a woodturner. In particular, shank 2, can be rested flat against a tool rest of a woodturning lathe (not illustrated) which is then used as a fulcrum for tool 1, so that cutting head 7, will be more easily orientated and retained in a correct position relative to a workpiece surface during a sweep of cutting edge 14, across that surface by the woodturner's hands.

Tool 1, has cutting head 7, extending coaxially of shank 2, so that faces 8,9, extend parallel to each other and also parallel to longitudinal axis 5. In this embodiment, cutting head 7, has hole 10, extending therethough perpendicular to faces 8,9. Faces 8,9, may be spaced apart as in the previous embodiment. Inner surface 12, and outer surface 13, are again shaped so that cutting edges 14, are provided on each of faces 8, and 9. This is achieved by converging inner surface 12, toward outer surface 13, adjacent each face 8,9. Outer surface 13, may have the same arcuate radius as in the previous embodiment.

Tool 1, of this other embodiment may be used in the same manner as in the previous embodiment, although of course, here the tool may be reversed for cutting timber workpiece with either cutting edge 14.

A woodturning tool according to the present invention has been found to improve severing of timber fibres when compared to previous tools and thus provide a smoother surface finish to that workpiece, particularly hollow-ware workpieces. Further, it has been found that the tool can be used in a wide variety of woodturning applications. To that extent, the tool is of a general purpose nature, unlike many previous tools which have a limited or specific application in woodturning.

Because of the curved nature of the tool cutting edge, there is minimum likelihood of that cutting edge inadvertently or accidentally digging into the turning timber workpiece being shaped. As such, damage to the workpiece may be minimal. In addition, that tool is not likely to be dangerously wrenched from the control of a woodturner.

It is to be appreciated that modifications and/or alterations may be made to the tool without departing from the ambit of the present invention as defined in the claims appended hereto.

Having now described my invention what I claim as new and desire to secure by Letters Patent is:

1. A hand held cutting tool for use in cutting a turning timber workpiece comprising:

a long straight, rod-like tool shank;

a handle at one end of the tool shank; and a cutting head of unitary construction at the other end of the tool shank and rigid with the tool shank, said cutting head including:

a circular hole formed solely within the cutting head and having an end opening, the hole providing an inner surface of the cutting head and the cutting head having an outer surface outwardly of and extending at least in part about the inner surface, the end opening of the hole having a periphery which is of continuous extent about the opening and which convexly arcs along at least a partial extent thereof between the inner and outer surfaces, the cutting head having an arcuate sharp cutting edge extending in a flat plane along the periphery, and formed by the intersection of the outer surface and the inner surface, the cutting edge subtending an angle of at least about 180° with respect to a central axis of the hole, and the cutting edge extending symmetrically along the periphery on each side of the longitudinal axis of the tool, the inner surface adjacent the periphery being angled outwardly entirely along the extent of the periphery so as to converge toward the outer surface along the cutting edge, the outer surface adjacent the periphery extending perpendicular to the plane containing the cutting edge, such that, in use, the handle is gripped by at least one hand of the user and the cutting head is moved toward the timber workpiece, so that the outer surface of the cutting head immediately adjacent and perpendicular to the periphery rubs on a surface of the workpiece and the cutting edge convexly arcs toward and enages the workpiece surface in a cutting action and the cutting head is therefore moved over the workpiece surface with the cutting edge leading to progressively cut the workpiece.

2. A hand held cutting tool for use in cutting a turning timber workpiece, comprising:

a long, straight, rod-like tool shank;

a handle at one end of the tool shank; and a cutting head of unitary construction at the other end of the tool shank and rigid with the tool shank, said cutting head including an open-ended circular hole formed solely within the cutting head and extending entirely therethrough, the hole providing an inner surface of the cutting head and the cutting head having an outer surface outwardly of and extending at least in part about the inner surface, each end opening of the hole having a respective periphery which is of continuous extent about the opening and which convexly arcs along at least a partial extent thereof between the inner and outer surfaces, the cutting head having an arcuate sharp cutting edge extending in a flat plane along a substantial section of each arcuate periphery part and formed by the intersection of the outer surface and the inner surface, the cutting edge subtending an angle of at least about 180° with respect to a central axis of the hole, and the cutting edge extending symmetrically along the periphery on each side of the longitudinal axis of the tool, the inner surface adjacent the periphery being angled outwardly entirely along the extent of the periphery so as to converge toward the outer surface along the cutting edge, the outer surface adjacent the peripheries extending perpendicular to the respective planes containing the cutting edges, so that, in use, the handle is gripped by at least one hand of the user and the cutting head is moved toward the timber workpiece so that the outer surface of the cutting head immediately adjacent and perpendicular to one of the peripheries rubs on a surface of the workpiece and the cutting edge of that one periphery convexly arcs toward and engages the workpiece surface in a cutting action and the cutting head is thereafter moved over the workpiece surface with the cutting edge tending to progressively cut the workpiece.

* * * * *